United States Patent [19]

Konishi et al.

[11] Patent Number: 5,779,339
[45] Date of Patent: Jul. 14, 1998

[54] SURFACE LIGHT SOURCE APPARATUS

[75] Inventors: Satoru Konishi; Kazushige Ohta; Koji Kawada; Takashi Obata, all of Hadano, Japan

[73] Assignee: Stanley Electric Co., Ltd., Tokyo, Japan

[21] Appl. No.: 784,409

[22] Filed: Jan. 16, 1997

[30] Foreign Application Priority Data

Jan. 17, 1996 [JP] Japan .................. 8-023036

[51] Int. Cl.⁶ .................. F21V 7/04; G01D 11/28
[52] U.S. Cl. .................. 362/31; 362/26; 362/32; 362/29; 362/30
[58] Field of Search .................. 362/31, 32, 26, 362/29, 30; 349/58, 61

[56] References Cited

U.S. PATENT DOCUMENTS

| | | | |
|---|---|---|---|
| 4,096,550 | 6/1978 | Boller et al. | 362/31 |
| 4,257,084 | 3/1981 | Reynolds | 362/31 |
| 4,714,983 | 12/1987 | Lang | 362/27 |
| 4,974,122 | 11/1990 | Shaw | 362/31 |
| 5,128,781 | 7/1992 | Ohno et al. | 359/48 |
| 5,404,277 | 4/1995 | Lindblad | 362/31 |
| 5,410,454 | 4/1995 | Murase et al. | 362/31 |
| 5,617,251 | 4/1997 | Ohta et al. | 362/31 X |
| 5,647,655 | 7/1997 | Kashima et al. | 362/31 |
| 5,654,779 | 8/1997 | Nakayama et al. | 349/58 |
| 5,666,172 | 9/1997 | Ida et al. | 349/58 |

*Primary Examiner*—Ira S. Lazarus
*Assistant Examiner*—Nhat-Hang H. Lam
*Attorney, Agent, or Firm*—Weingarten, Schurgin, Gagnebin & Hayes LLP

[57] ABSTRACT

A surface light source apparatus is constituted such that an overhang portion overhanging a light source is provided on part of an end surface where the light source of an optical guide plate is arranged in such a manner that it is flush with the front surface of the optical guide plate and that an incident light control unit formed from a resin for diffusing and attenuating light is provided integratedly on at least an overhang portion side out of the overhang portion and the end surface of the optical guide plate, and accordingly light from the light source is transmitted through the overhang portion, radiated in an illumination direction, and diffused and attenuated by the incident light control unit to equalize the amount of light so that it can be used as illumination light. Thereby, the total area of the light emitting portions is increased.

2 Claims, 2 Drawing Sheets

5,779,339

1

SURFACE LIGHT SOURCE APPARATUS

BACKGROUND OF THE INVENTION

1. Field of the Invention

This invention relates to a surface light source apparatus used as a backlighting source for illuminating a liquid crystal display unit from back in portable equipment employing a liquid crystal unit, such as office equipment and visual equipment.

2. Background Art

FIG. 4 shows the configuration of this type of surface light source apparatus 90 of the prior art in which an optical guide plate 91 is formed substantially rectangular from a transparent resin and has a certain thickness and reflecting units 92 are formed on the rear surface 91a thereof by, e.g., dot printing with a white coating. Light sources 93 such as a fluorescent lamp are provided on end surfaces 91b on the thickness sides of the optical guide plate 91 together with reflectors 94. A diffusion plate 95 is provided on the front surface 91c side of the optical guide plate 91 and a reflection plate 96 is provided behind the reflecting units 92.

In the surface light source apparatus 90 constituted above, light from the light source 93 which is input into the inside of the optical guide plate 91 from the end surface 91b is totally reflected on a contact surface between the optical guide plate 91 and the air and goes through the optical guide plate 91. At this point, light which reaches the reflecting unit 92 provided on the rear surface 91a is reflected in a diffused state by this reflecting unit 92 and part of the light is radiated to the outside from the front surface 91c.

Therefore, when the density of forming the reflecting units 92 is suitably adjusted according to the distance from the light source 93, the light radiated to the outside from the front surface 91c can have substantially uniform brightness over the entire surface. This light is diffused by the diffusion plate 95 again to further improve the uniformity of its brightness so as to illuminate the liquid crystal display unit 50. Therefore, in the surface light source apparatus 90 of the prior art, an area substantially equal to the size of the optical guide plate 91 is a light emitting section A.

However, since the light sources 93 and the reflectors 94 are provided outside the optical guide plate 91 in the above surface light source apparatus 90 of the prior art, the outside dimension D of a display unit 60 including the surface light source apparatus 90 and the liquid crystal display unit 50 is determined by the light sources 93 and the reflectors 94 of the surface light source apparatus 90. Thereby, the proportion of a non-light emitting section B to the light emitting section A increases and the entire display unit 60 becomes bulky.

Especially, in portable equipment such as a personal computer, TV receiver or camcorder, an increase in the size of the display unit 60 caused by an increase in the size of the surface light source apparatus 90 leads to an increase in the size of the entire equipment and impairs its portability. Therefore, a solution to this problem has been awaited.

SUMMARY OF THE INVENTION

The present invention provides, as means for solving the above problem, a surface light source apparatus comprising an optical guide plate formed substantially rectangular from a transparent member and having a reflection treated rear surface and at least one light source arranged on one of end surfaces on the thickness sides of said optical guide plate, wherein an overhang portion overhanging the light source is

2 provided on part of the end surface where the light source of the optical guide plate is arranged in such a manner that it is flush with the front surface of the optical guide plate and that an incident light control unit formed from a resin for diffusing and attenuating light is provided integratedly on at least an overhang portion side out of the light source facing surfaces of the overhang portion and the end surface of the optical guide plate. As a consequence, the proportion of light emitting portions is increased with respect to the outside dimension of the surface light source apparatus to solve the problem.

DETAILED DESCRIPTION OF THE PREFERRED EMBODIMENTS

Figure 1:
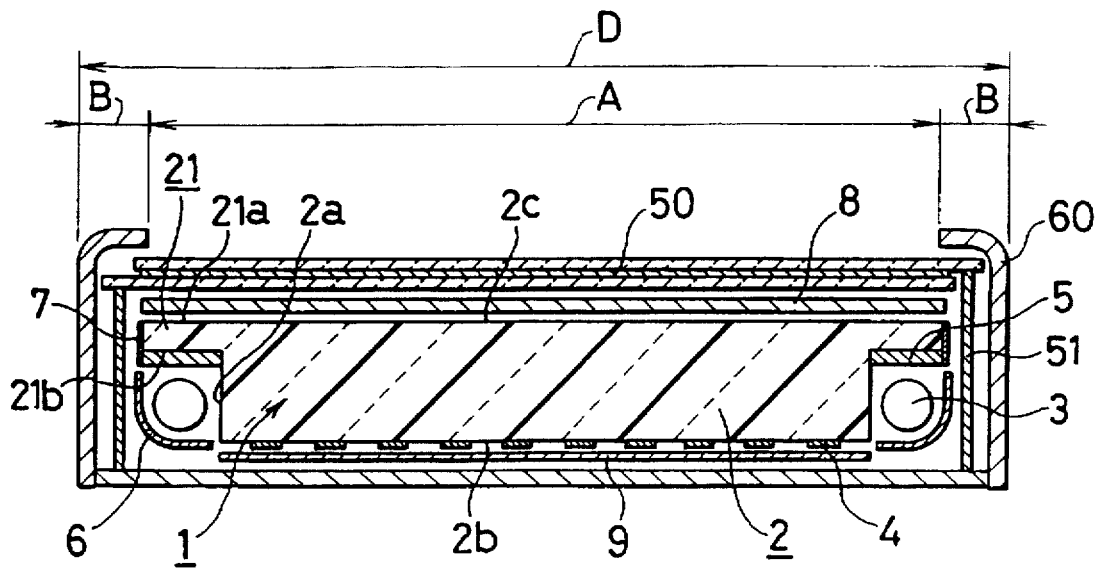
FIG. 1 is a sectional view of a surface light source apparatus according to an embodiment of the present invention.

The present invention is described in detail with reference to an embodiment shown in the figures. In FIG. 1, reference numeral 1 denotes a surface light source apparatus according to the present invention which is used as a backlighting source for a liquid crystal display unit and is the same as the prior art in that light sources 3 are arranged on end surfaces 2a on the thickness sides of an optical guide plate 2 which is formed substantially rectangular from a transparent member such as a resin.

The surface light source apparatus 1 is also the same as the prior art in that reflecting units 4 are formed on a rear surface 2b of the optical guide plate 2 by dot printing with a white coating and the density thereof is adjusted according to the distance from the light source 3, for example, so that light radiated to the outside from a front surface 2c can have uniform brightness over the entire surface.

In the present invention, overhang portions 21 overhanging the respective light sources 3 are provided on the end surfaces 2a where the light sources 3 of the optical guide plate 2 are arranged. The overhang portions 21 are formed integratedly from a transparent member from which the optical guide plate 2 is formed in such a manner that the front surface 2c of the optical guide plate 2 is flush with the front surfaces 21a of the overhanging portions 21. In other words, the overhang portions 21 project above the light sources 3 from the front surface 2c side of the end surfaces 2a of the optical guide plate 2 like a visor.

Incident light control units 5 formed from a member for diffusing light, such as an opaque resin, are formed integratedly on respective light source facing surfaces 21b of the overhang portions 21 by suitable means such as one-piece molding or ultrasonic welding. The member forming the incident light control units 5 may be an opaque member which diffuses light and is colored achromatic with a suitable density to control transmissivity.

Since the overhang portion 21 is provided on the end surface 2a as described above, only a portion near the rear surface 2b from the center of the light source 3 of each of the reflectors 6 provided outside the light source 3 is formed curved and a portion near the front surface 2c from the center of the light source 3 is formed parallel to the end surface 2a so that light from the light source 3 is directly incident upon the incident light control section 5.

Further, an overhang portion reflecting surface 7 is formed on the outer end surface of the overhang portion 21, for example, by affixing a metallized tape and a dispersion plate 8 is also provided on the front surface 2c side of the optical guide plate 2. This dispersion plate 8 is large enough to cover the overhang portions 21. Also in the surface light source apparatus 1 of the present invention, a reflecting plate 9 is provided behind the reflecting units 4 like the prior art.

A description is subsequently given of the function and effect of the surface light source apparatus 1 having the above constitution. Due to the provision of the overhang portions 21 above the light sources 3 according to the present invention, light from each of the light sources 3 is directly incident upon the overhang portion 21, passes therethrough and reaches the dispersion plate 8 provided above the overhang portion 21.

Since the overhang portion 21 is provided with the incident light control unit 5, the light from the light source 3 is suitably diffused with the result that its brightness is reduced and becomes equal to that of other portions of the surface light source apparatus 1. When the amount of a reduction in brightness is insufficient with the above diffusion function alone, the achromatic coloring of the incident light control unit 5 as described above is carried out to make uniform the brightness of the surface light source apparatus 1.

Therefore, according to the present invention, even a portion above the light source 3 which has been a non-light emitting portion in the prior art can be used as a light emitting portion A. For example, where a liquid crystal display unit 50 having the same area is to be illuminated, the surface light source apparatus 1 can be made much smaller than that of the prior art.

The liquid crystal display unit 50 is provided with terminal units 51 for supplying power for driving the liquid display unit 50. To conceal the terminal units 51, it is necessary to form non-light emitting portions B in fact. However, it is possible to install the surface light source apparatus 1 of the present invention without expanding the distance between the terminal portions 51 and to limit the proportion of the non-light emitting portions B in the outside dimension of the display unit 60 which consists of the surface light source apparatus 1 and the liquid crystal display unit 50 to the minimum value required for concealing the terminal portions 51.

Figure 2:
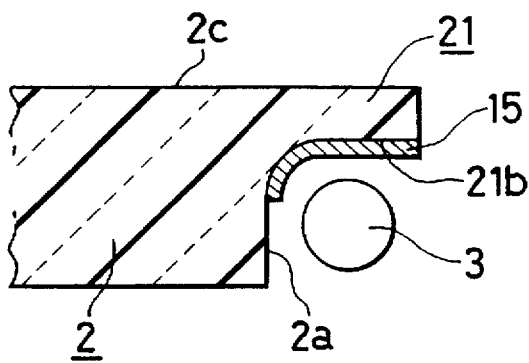
FIG. 2 is a sectional view of key parts of a surface light source apparatus according to another embodiment of the present invention.

FIG. 2 shows another embodiment of the present invention. While the incident light control unit 5 is provided only on the light source facing surface 21b of the overhang portion 21 to diffuse and attenuate direct light from the light source 3 in the above embodiment, the present invention is not limited to this. In the actual surface light source apparatus 1, light coming from the light source 3 through the end surface 2a may reach directly the front surface 2c and be radiated to the outside as direct light according to the positional relationship between the end surface 2a and the light source 3, for example.

In this case, the above-mentioned direct light has high brightness and impairs uniformity in brightness with other portions. Then, in this embodiment, the incident light control unit 15 is suitably extended to part of the end surface 2a and diffuses and attenuates the above direct light to make its brightness equal to that of other portions.

Figure 3:
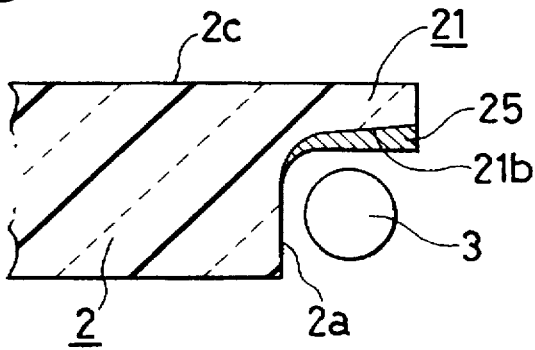
FIG. 3 is a sectional view of key parts of a surface light source apparatus according to still another embodiment of the present invention.
Figure 4:
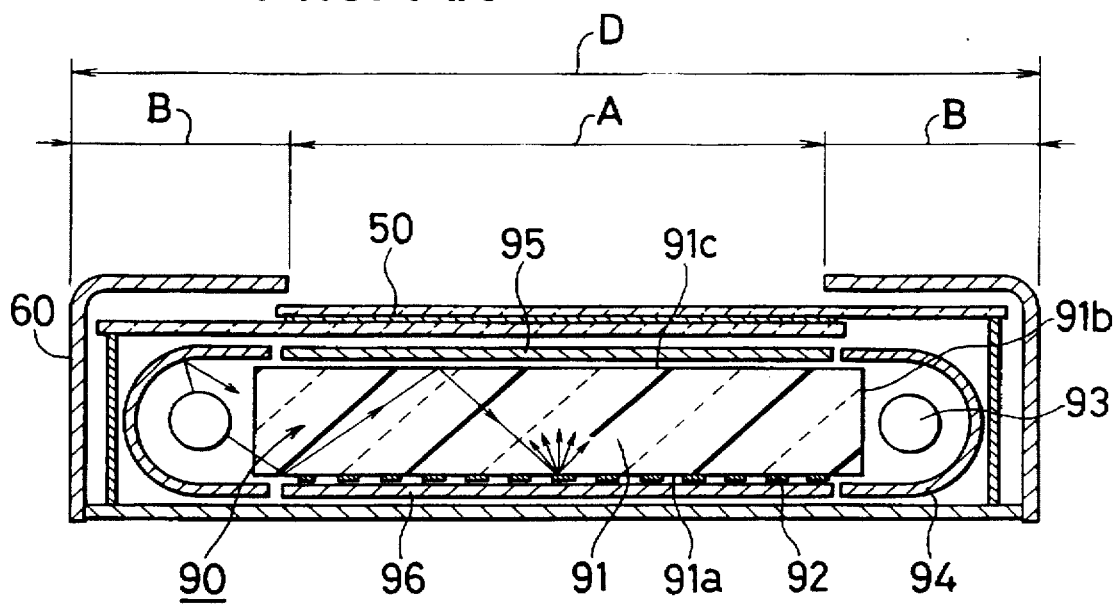
FIG. 4 is a sectional view of the prior art.

FIG. 3 shows still another embodiment of the present invention. While the incident light control units 5 and 15 of the above embodiments are formed to have an uniform thickness, the present invention is not limited to this. That is, the brightness of the above direct light differs according to the distance from the light source 3 to the incident light control unit 15 or the end surface 2a and, if there is an apparent boundary between a portion having the incident light control unit 5 or 15 and a portion having no incident light control unit 5 or 15, there will be easily produced a difference in brightness at the boundary.

In this embodiment, the thickness of the incident light control unit 25 is changed in consideration of the above conditions. Especially at the boundary, the thickness is reduced to prevent a difference in brightness from being produced between a portion having the incident light control unit 25 and a portion having no incident light control unit 25. Since this embodiment and the embodiment shown in FIG. 2 have the same functions and effects other than those described above as the embodiment of FIG. 1, their detailed descriptions are omitted.

As described on the foregoing pages, according to the present invention, since a surface light source apparatus is constituted such that an overhang portion overhanging a light source is provided on part of an end surface where the light source of an optical guide plate is arranged in such a manner that it is flush with the front surface of the optical guide plate and that an incident light control unit formed from a resin for diffusing and attenuating light is provided integratedly on at least an overhang portion side out of the light source facing surfaces of the overhang portion and the end surface of the optical guide plate, light from the light source is transmitted through the overhang portion, radiated in an illumination direction, and diffused and attenuated by the incident light control unit to equalize the amount of light so that it can be used as illumination light. Thereby, the surface light source apparatus is made smaller, thus providing an extremely excellent effect of reducing the size of equipment using this type of surface light source apparatus.

What is claimed is:

1. A surface light source apparatus comprising an optical guide plate formed substantially rectangular from a transparent member and having a reflection treated rear surface and at least one light source arranged on one of end surfaces on the thickness sides of said optical guide plate, wherein an overhang portion overhanging the light source is provided integratedly on part of the end surface where the light source of the optical guide plate is arranged in such a manner that it is flush with the front surface of the optical guide plate; and an incident light control unit formed from a resin for diffusing and attenuating light is provided integratedly on at least an overhang portion side out of the light source facing surfaces of the overhang portion and the end surface of the optical guide plate.

2. A surface light source apparatus according to claim 1, wherein the thickness of said incident light control unit is changed only in the direction of transmitting light from the light source and reduced to zero at a boundary portion.

* * * * *